3,282,416
METHOD OF TREATING QUARTZ SANDS
Hugh W. Coke, Jamestown, Calif., assignor, by mesne assignments, to International Pipe and Ceramics Corporation, East Orange, N.J., a corporation of Delaware
Filed Oct. 22, 1962, Ser.No. 232,098
11 Claims. (Cl. 209—12)

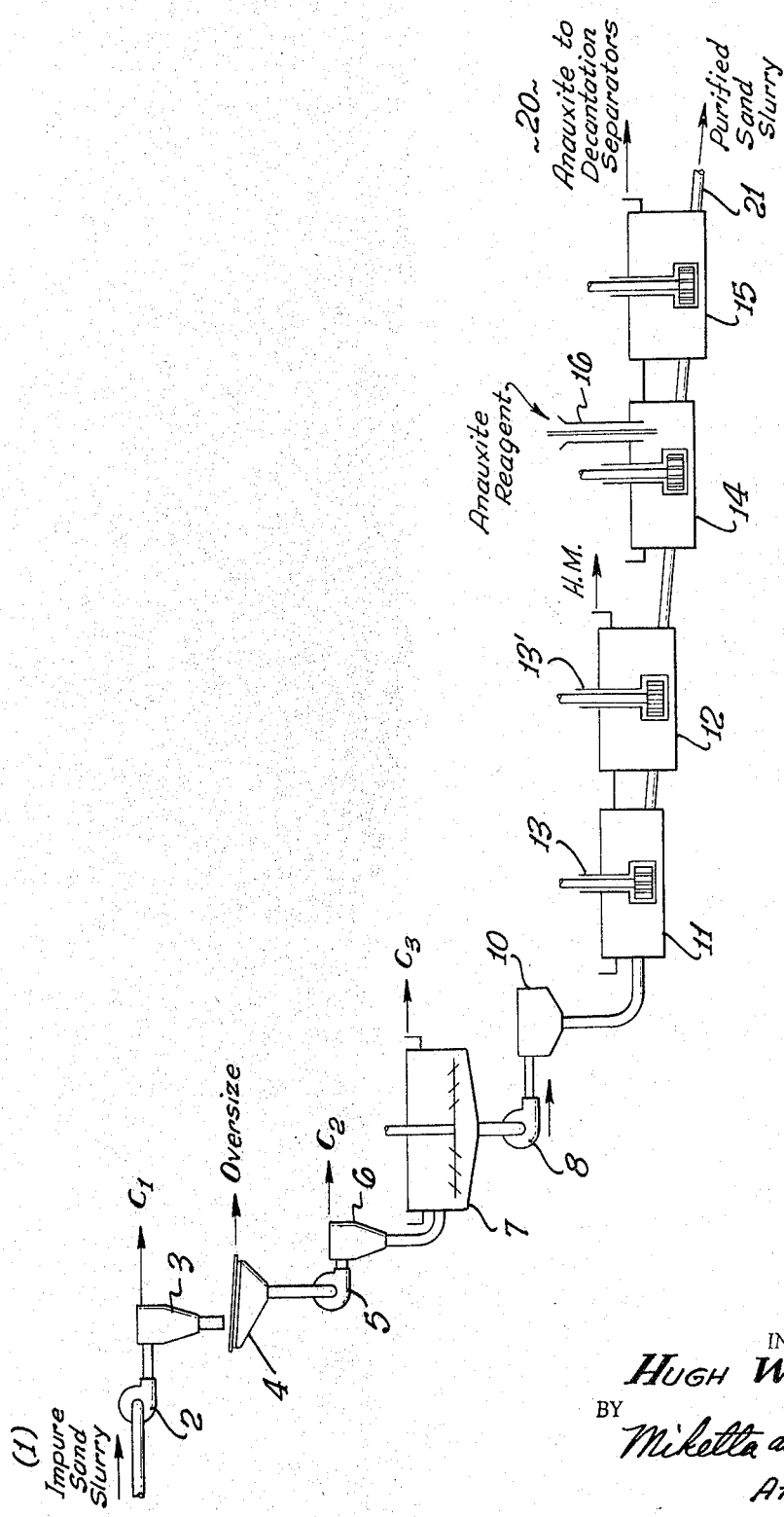

This invention relates to a method of producing purified quartz sands adapted for use in the manufacture of glass and for other purposes. The invention is particularly directed to a method of reducing the content of alumina in washed quartz sands and in controlling the residual content of alumina to within low and narrow limits when such alumina is of highly refractory nature so as to permit the production of a uniform glass making sand.

Sand for use in the manufacture of glass should be of relatively uniform size distribution and be substantially free from iron compounds. Many clay-like substances and iron minerals can be removed from silica sand by water washing and classification (mechanical classifiers and cyclones can be effectively used) so as to produce a sand from which clays and fines have been removed. Heavy minerals and metal oxides (including ilmenite, rutile, hematite, magnetite, limonite, siderite, zircon, andalusite, etc.) can then be removed by flotation. Sands so produced for use by the glass industry are of graded or varied particle size, generally passing a 24 or 30 mesh and remaining on a 200 mesh sieve with but a minor proportion (8%–20%) passing a 100 mesh sieve. A low, substantially uniform $Al_2O_3$ content is desirable.

Silica sand obtained from sandstones and sands and treated in the above manner (particularly from locations in north-central portions of California) still contains appreciable and variable quantities of aluminous substances which render the sands more difficult to fuse to a clear glass. Although it may be desirable that the final glass batch contain a specific quantity of $Al_2O_3$ (generally attained by the addition of feldspar or the like), variation in $Al_2O_3$ content of the sand makes it difficult, if not impossible, to maintain control of final glass analysis.

It has been found that refractory aluminous substances (sometimes called anauxite) are present in such sands in material amounts; these aluminous substances occur in the form of plates and fine scales intermixed with the quartz grains and are extremely resistant to removal by normal water washing, scrubbing, and classification processes. It may be noted that the anauxite-type material has a specific gravity which is very close to that of quartz; it is an aluminum silicate having a chemical formula $Al_2O_3.3SiO_2.2H_2O$ and is highly refractory. The presence of such refractory aluminous material in glass sand is undesirable since it resists melting of a batch under normal time and temperature conditions, often results in the formation of stones in the glass, and contributes unwanted iron (brought in as iron absorbed or adsorbed in the refractory aluminous material).

The present invention is particularly directed to the treatment of a prewashed, deslimed and preliminarily graded quartz sand for the purpose of removing this objectionable aluminous mineral to thereby produce a glass sand which has a uniformly low $Al_2O_3$ content. Although, as stated hereinabove, the specific gravity of the refractory anauxite-type aluminous substance is very close to that of quartz, it has been found that by the use of certain primary fatty amines, under controlled conditions, such anauxite-type material can be readily floated away from the sand.

An object of the present invention is to disclose and provide a method of producing a useful glass-manufacturing sand having a uniformly low content of refractory alumina material.

A further object is to disclose and provide means, methods, ingredients and conditions whereby refractory aluminous material of the anauxite type may be readily removed from a quartz sand at any desired stage of its purification and grading or classification.

These and other objects will be apparent from the following description, the appended drawing illustrating one form of the method.

The removal of refractory anauxite-type aluminous material from the sand by the use of the reagents and conditions hereafter described is preferably carried out after the initial disintegration, pulping, washing and desliming (which has removed clays and some feldspathic minerals, but not the heavy minerals and metal oxides). The washed and deslimed sand is now in the form of a thick, sand-water slurry containing about 65%–70% solids; this slurry can be readily raked or conveyed to a flotation circuit. The removal of the undesired refractory aluminous material can be accomplished at any stage of the flotation circuit, i.e., prior to, during or after the removal of the heavy minerals and metal oxides. Removal of the anauxite-type material at an intermediate or later stage is preferred since the primary fatty amines used to liberate and float the such material away are more effectively used at such intermediate or final stages and the froth will be less heavily laden with heavy minerals.

The appended simplified and schematic diagram illustrates, in flow-chart form, an example of the method of this invention. An impure sand slurry, suitably pulped and diluted for effective handling by the subsequent cyclones and scrubbers, is indicated at 1 as being fed into the system by a pump 2. This slurry may contain from about 20% to 50% solids in the form of impure sand, the solids content being generally in the lower portion of this range. The pump 2 feeds the slurry to a series of primary cyclones 3, only one being illustrated for purposes of simplification. The lighter and finer clay components are removed from the slurry in the form of overflow indicated at C1.

In the diagram, the tails or scrubbed sand is shown passing to a suitable wet screen 4, where oversize (particles remaining on 20, 24 or 30 mesh sieve) is removed. The screened slurry (without or preferably with added water) is now passed by pump 5 to another set of cyclonic separators 6 from which additional clay-containing suspension is discharged, as indicated at C2. The sand slurry discharged from cyclones 6 may be sent to a classifier 7: this may be provided with slowly revolving rakes to facilitate suspension and removal of clay-like materials by way of the overflow (as indicated at C3) and to also feed the deslimed and partially purified sand to a pump 8.

In the appended diagram, the pump 8 is shown feeding the sand slurry to a conditioning tank 10, but a further set of scrubbers or other devices for removing additional impurities may be introduced into the system in advance of the conditioning tank 10 if it is so desired.

The sand slurry from the classifier 7 may have a solids content of between about 60% to 70% or 73%, and this slurry is now diluted to a solids content of between 20% and 30% for flotation. At the conditioning tank 10, the pH of the slurry is adjusted by the addition of mineral acid or an alkaline material such as sodium carbonate, and suitable flotation agents, petroleum oil and frothing agents are added to facilitate removal of heavy minerals in the flotation cells. Although the separation of heavy minerals from the quartz sand may be accomplished in an acid medium as well as in an alkaline medium, the use of an inexpensive alkaline reagent such as sodium carbonate, and the use of a pH of between about 8 to 9.0 is preferred for reasons of economy. For example, to the conditioning tank (or tanks) there may be added a sufficient amount of sodium carbonate to attain a pH of 8.5, about 0.3 to 0.5 lbs. per ton of solids of a flotation agent such as American Cyanamid's 721, about 0.3–0.5 lbs. per ton of solids of a suitable frothing agent (such as a soap) and 0.2 lbs. per ton of solids of a petroleum fuel oil.

After the slurry has been conditioned in tank 10 (for a period of from 3 to 9 or 10 minutes), it is passed through one or more flotation cells indicated at 11 and 12, equipped with suitable agitating and air-injecting means such as 13 and 13'. Although various forms of agitation may be employed, good results have been obtained by using an outer stator cage having spaced vanes and an inner driven rotor of squirrel cage configuration, air being sucked in and positively intermixed with the slurry.

The heavy minerals are floated off and discharged at H.M., the overflows from cells 11 and 12 having a common outlet. The partially purified sand slurry or tails discharged from cell 12 may now pass into one or more flotation cells 14 and 15 for special treatment for the removal of the anauxite-type aluminous material. In the diagrammatic flow chart, the selective reagent (a primary fatty amine) is shown being added to cell 14 at 16.

The reagents used in selectively activating the refractory aluminous material and effectively suspending it so as to permit its removal with the froth discharged from the flotation cells 14 and 15 are primary aliphatic (fatty) amines having branched alkyl chains, with the primary amino nitrogen directly attached to a tertiary carbon atom. The alkyl groups may contain 8 to 22 carbon atoms; primary amines whose alkyl groups contain 12 to 18 carbon atoms have given uniformly good results. These primary amines are cationic surface agents and are specific collectors for the undesired refractory aluminous materials, their effect being extremely rapid so that conditioning time is not needed when the contaminated sand slurry is within the desired pH range. This selective action of the primary fatty amines is not exhibited by fatty amine salts, such as chlorides and acetates, nor by secondary or tertiary fatty amines.

Suitable primary amines are produced by a number of manufacturers, including Rohm & Haas Co., manufacturers of "Primene 81–R" (containing principally groups having 8 to 14 C), and "Primene JM–T" (containing principally 18 to 22 C), and Armour Chemical Division of Armour & Co., Chicago, Illinois, whose primary fatty amines sold under the trade name "Armeen" have been found effective. "Armene"–8 and 8D contains mostly groups of 8 C atoms; "Armeen" 12 is composed principally of groups having 12 C atoms whereas "Armeen" 18 principally contains 18 C groups, "Armeen" S, SD, HT and HTD contain groups of 16 and 18 C; "Armeen" C contains a variety of alkyl groups having from 8 to 18 C atoms. All have been found to be effective to float off the undesired anauxite-type refractory aluminous material when added to the sand slurry at the rate of between about 0.3 to 0.5 lbs. per ton of solids, provided the pH of the slurry is within certain limits.

It has been found that these primary fatty amines exert their selective flotation effect when the slurry is at a pH of between about 2.5 and 3.5 and again when the pH is between about 9 and 10.5. Since the separation of heavy minerals is preferably conducted on the alkaline side (at say pH 8–8.7), it is more economical to use the selective reagent also on the alkaline side. Therefore, additional alkali (or a salt of a strong base and a weak acid) is added to the slurry at 16 to adjust the pH to between about 8 and 10.5. The adjustment of pH to within the range (or ranges) given is important since the selective action of the primary fatty amines is disrupted as the pH approaches 7 and in that event, a large proportion of quartz will float off. When the pH drops below 2.5 or exceeds 10.5, unnecessarily large quantities of the primary amines need be used.

The froth from cells 14 and 15 will contain the heavy, refractory aluminous substances including what has been termed anauxite and may be discharged as at 20 to a sump, or preferably to suitable decantation type of separators, filters, etc., to permit recovery of the refractory aluminous material as a separate product. The purified sand is discharged at 21 as a slurry, and may be dewatered, filtered, dried or otherwise treated for storage and shipment.

The results obtained in a large number of runs indicated that when the flotation system was used on washed sand for the removal of heavy minerals alone (without the use of the primary amines), the resulting sand varied in alumina content between 0.15% and 0.25% with an average of 0.20% $Al_2O_3$: when a primary fatty amine was used in the latter part of the flotation system, the resulting sand had an average $Al_2O_3$ content of 0.09% with 0.11% as the maximum and 0.06% as the minimum. In other words, the alumina content was reduced by more than 50% and greater uniformity was attained. Results of the same order are obtained when the reagent is added at an early stage and the anauxite-type substances and heavy minerals are removed concurrently.

It is to be noted that the appended diagram indicates only four cells in the flotation system for purposes of simplification. In actual practice, two, four or six cells could be used. Moreover, only one cell could be used for removal of heavy minerals and two, four or six used to remove the refractory aluminous, anauxite-type material. As previously stated, the primary amine reagent can be added at the first cell of a series (if a mixture of heavy minerals and anauxite-type aluminous materials is to be removed), at the last cell or at a cell therebetween, depending upon circumstances and the type of by-product desired.

In some instances, the purified sand discharged at 21 may be subject to a further treatment for the removal of iron carbonates, siderite and other iron-carrying impurities. Such further special treatment can be carried out in a flotation system under substantially neutral conditions (pH 7 to 7.3) with sodium salts of fatty acids as the flotation agent for the quartz or silica (recovered in the froth) while the iron carbonate, etc., is discharged in the tails.

The glass sand produced in accordance with the method of purification described herein is eminently suited for use in the manufacture of glass, whether the last described step of removing iron carbonates and the like is used or not, since it contains not over about 0.2% of highly refractory $Al_2O_3$. The removal of the refractory aluminous material of the anauxite-type is the most important step. It is to be understood that the term anauxite as used herein includes allied aluminous silicates which have the common characteristics of being highly refractory and difficulty separable from quartz. The aluminous material which is recovered also has commercial value since it has a pyrometric cone equivalent of between about 31 and 34, indicating that it is a highly refractory material adapted for use in the production of electrical insulators and other ceramic articles. Moreover, its adsorptive properties make it valuable in the manufacture of granules and shapes for use in scrubbing towers, vapor phase catalysis, as carriers for catalytic agents, etc., as well as a finely divided carrier for pigments, dyes, insecticides, etc.

All modifications and changes embraced by the claims appended hereto are within the scope of this invention.

I claim:
1. In a method of beneficiating quartz sands containing a high and variable content of highly refractory aluminum silicates including highly refractory aluminous material of the anauxite-type, the steps of:
   removing clay-like foreign matter from impure quartz sands by washing and decantation with water to produce a sand slurry;
   adjusting the pH of the slurry to a point away from neutrality but to not below a pH of 2.5 nor above pH 11;
   adding between about 0.3 and 0.5 lbs. of a primary fatty amine whose alkyl groups contain between 8 and 22 carbon atoms to the slurry per ton of solids in such slurry;
   subjecting the slurry so treated to flotation with agitation and introduction of air to float off a fraction containing refractory aluminous material of the anauxite-type and produce a residual sand containing not more than about 0.2% of refractory alumina.

2. In the method as stated in claim 1, the step of diluting the sand slurry to a solids content of between about 20% and 30% prior to flotation.

3. The method as stated in claim 1 wherein the flotation is carried out in the presence of added petroleum oil.

4. The method as stated in claim 1 wherein the pH of the slurry is adjusted to between about pH 8 and pH 10.5 by the addition of sodium carbonate and such slurry contains between about 20% and 30% solids.

5. In the method as stated in claim 1, the additional step of removing a refractory aluminous material containing anauxite-type substances from the flotation froth.

6. A method of reducing the alumina content of washed quartz sand, containing a highly refractory aluminous material of the anauxite type composed essentially of particles passing a 20 mesh and remaining on 200 mesh sieves, to produce a sand adapted for use in the manufacture of glass and having a low and controlled alumina content, comprising:
   removing heavy minerals from a slurry of such washed quartz sand to produce a partly purified sand slurry containing between 20% and 30% solids;
   adjusting the pH of the slurry to a point away from neutrality but to not below a pH of 2.5 nor above pH 11;
   adding between about 0.3 and 0.5 lbs. of a primary fatty amine whose alkyl groups contain between 8 and 22 carbon atoms to the slurry per ton of solids in such slurry;
   subjecting the slurry so treated to flotation with agitation and introduction of air to float off a froth containing refractory aluminous material of the anauxite type and produce a residual sand containing not more than 0.5% of alumina.

7. The method as stated in claim 6 wherein the flotation is caried out in the presence of added petroleum oil.

8. The method as stated in claim 6 wherein the pH of the slurry is adjusted to between about pH 8 and pH 10.5 by the addition of sodium carbonate.

9. In the method as stated in claim 6, the additional step of removing a refractory aluminous material of the anauxite-type from the flotation froth.

10. In a method of treating washed quartz sands containing a highly refractory aluminous material to produce a sand adapted for use in the manufacture of glass and having a very low and controlled content of alumina, the steps of: producing a partly purified sand slurry containing between 20% and 30% of solids; adjusting the pH of the slurry to between about 8 and 9; adding between about 0.3 and 0.5 lbs. of a primary fatty amine whose alkyl groups contain between 8 and 22 carbon atoms, to the slurry per ton of solids in such slurry; subjecting the slurry so treated to flotation with agitation and introduction of air to float off refractory aluminous material and produce a residual sand containing not more than about 0.2% alumina.

11. A method of the character stated in claim 10 wherein the flotation is carried out in the presence of added petroleum oil.

References Cited by the Examiner

UNITED STATES PATENTS

| | | | |
|---|---|---|---|
| 2,297,689 | 10/1942 | O'Meara | 209—166 |
| 2,409,665 | 10/1946 | Cole | 209—166 |
| 2,633,241 | 3/1953 | Banks | 209—166 |
| 2,769,540 | 11/1956 | Brown | 209—166 |
| 2,792,940 | 5/1957 | Baarson | 209—166 |

OTHER REFERENCES

Canadian Mining and Metallurgical Bulletin 47, No. 504, pages 240–250, 1954.

HARRY B. THORNTON, *Primary Examiner.*

R. HALPER, *Assistant Examiner.*